H. E. R. LITTLE.
PRIMARY BATTERY.
APPLICATION FILED JULY 26, 1912.
1,060,468.
Patented Apr. 29, 1913.
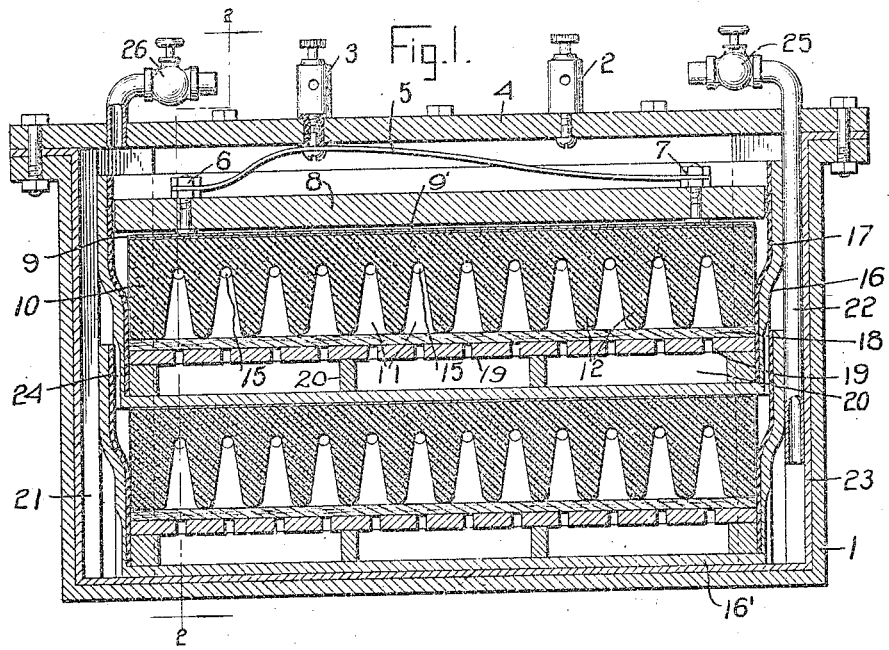
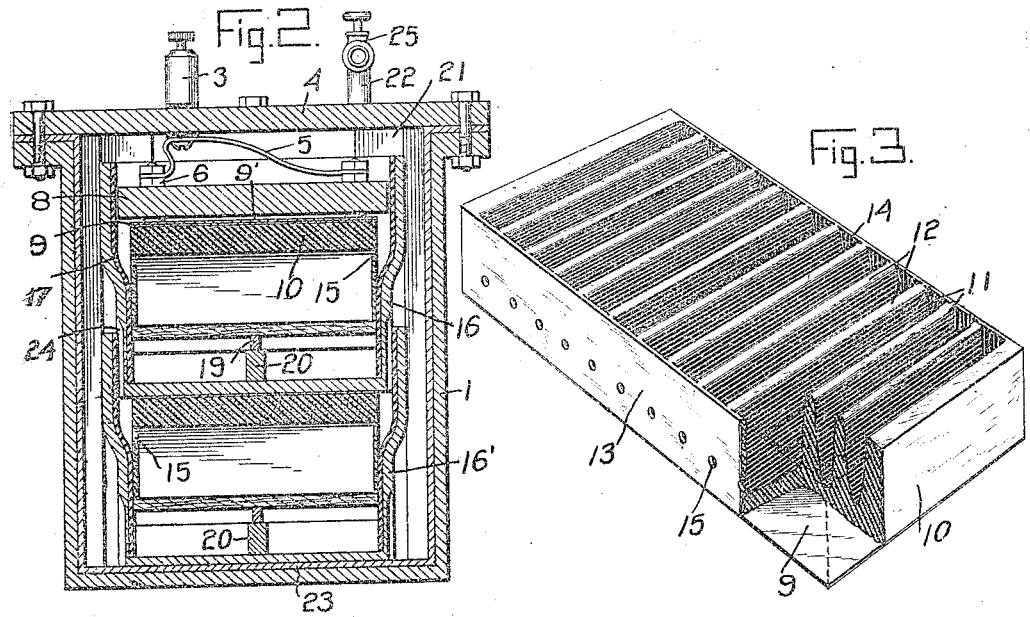
WITNESSES
C. F. Reichenbach
A. L. Kitchin
INVENTOR
Homer E. R. Little
BY
Munn & Co
ATTORNEYS

UNITED STATES PATENT OFFICE.

HOMER E. R. LITTLE, OF NEW YORK, N. Y.

PRIMARY BATTERY.

1,060,468.

Specification of Letters Patent.

Patented Apr. 29, 1913.

Application filed July 26, 1912. Serial No. 711,693.

*To all whom it may concern:*

Be it known that I, HOMER E. R. LITTLE, a citizen of the United States, and a resident of the city of New York, borough of Manhattan, in the county and State of New York, have invented a new and Improved Primary Battery, of which the following is a full, clear, and exact description.

This invention relates to primary cells, and has for an object to provide an improved structure in which a maximum voltage may be secured at any time without injury to the cell.

A further object of the invention is to provide an improved construction of primary cell in which the active agent is a gas adapted to be continuously supplied during the use of the cell.

A still further object of the invention is to provide a primary cell from which a maximum voltage is secured and in which the various units may be so arranged that they may be placed in series without increasing the internal resistance so that substantially the full voltage of each unit of the cell is received from the binding post.

In carrying out the objects of the invention, a housing, preferably of steel, is provided in which a plurality of units or independent cells may be arranged in series or in which only one cell or unit may be placed. The cell proper or unit is formed of metal and has a metallic electrode and a carbon electrode substantially insulated from each other but connected by a suitable electrolyte so that when the proper gas is forced into the cell a chemical action will result for producing or causing an electrical current to be generated. The continuous supplying of new gas will maintain the cell in a working condition until certain of the parts have been entirely consumed or dissolved by the action of the gas and electrolyte, whereupon new parts must be substituted in order to continue the use of the cell.

A practical embodiment of the invention is represented in the accompanying drawings forming a part of this specification, in which similar characters of reference indicate corresponding parts in all the views.

Figure 1 is a longitudinal vertical section through a cell of the device embodying the invention; Fig. 2 is a section through Fig. 1 approximately on the line 2—2; and Fig. 3 is an inverted perspective view of a carbon electrode embodying certain features of the invention.

In forming a device embodying the invention, it will be understood that the active elements are a metal, preferably zinc, and a halogen, as for instance chlorin or bromin. These active agents are so arranged that by a continuous supply of the chlorin gas the action of the battery will be continued until the zinc or other active member is consumed. In the drawings will be seen one embodiment of the invention, though it will be understood that various changes in materials and detail structures may be used at various times without departing from the spirit of the invention.

Referring to the accompanying drawings by numerals, 1 indicates a housing, preferably of steel, to which is secured a binding post 2 whereby it will be observed that the housing 1 acts as one electrode. A binding post 3 is provided on the top or cover 4 of the housing 1 and which is insulated therefrom and which is connected with a metallic member 5. The metallic member 5 is connected with suitable binding bolts or posts 6 and 7 mounted on a rubber or celluloid covering 8. The binding posts or bolts 6 and 7 extend through the covering member 8 and are secured to a metallic plate 9' in any desired way, as for instance by being soldered thereto. The plate 9' is adapted to rest on an electro-plated portion 9 provided on the carbon electrode 10. The electrode 10 is provided with a plurality of grooves 11 extending across the same but falling short of the sides, whereby ridges or corrugations 12 are provided and side members 13 and 14. In the side members 13 and 14 are arranged a plurality of apertures or openings 15 which are preferably arranged opposite the upper or outer part of the grooves 11. The carbon electrode 10, except the corrugations, is made impervious to liquid by any suitable method, as for instance by immersing the same in hot paraffin so as to fill the spaces of the porous carbon. This will protect the electro-plated surface 9 while the cell is in operation from the electrolytic action of the salts in solution, which would otherwise creep up through the porous carbon. The electrode 10 is arranged in a zinc container 16 which is lined on the sides and ends with celluloid or hard rubber 17 so as to prevent contact between the sides and ends and the electrode.

Arranged immediately below and supporting the electrode 10, is a sheet 18 of asbestos cloth, preferably of the kind that is woven so that the same may be more or less porous so as to permit a proper circulation of the electrolyte, which is preferably an aqueous solution of a halogen salt. Immediately below the asbestos sheet 18 is arranged a zinc or other metal electrode 19 formed preferably of gridiron shape. Below and supporting the electrode 10 is a frame 20 preferably of zinc which rests on the bottom of the container and which supports the electrode 19 and other members arranged above the same. The frame 20 rests directly on the bottom of the container 16 so as to permit the free passage of current from the bottom of the container through frame 20, electrode 19, the aqueous solution impregnating the cloth 18, and the carbon electrode 10.

The container 16 is spaced from the sides and ends of the housing 1 by suitable corner spacing members 21 so that when the gas is forced in through pipe 22 a free circulation of the same may be had.

In order to prevent the gases from affecting the cell housing 1, a lead inner covering 23 is provided which will permit the free passage of an electrical current, but will protect the housing.

Each of the containers 16 is provided with passageways 24 for permitting the gases to pass downward into succeeding containers, as for instance into the container 16′, when the same are arranged in series in the same housing.

It will be evident that any number of the cells could be arranged in the same housing without departing from the spirit of the invention, so that from one housing a large voltage could be drawn as well as a comparatively large amperage.

By providing the plating 9 on each of the electrodes 10 when a plurality of cells are arranged in a single housing the same may be easily connected in series, namely, by merely assembling the various cells together.

After the cell has been properly assembled, an aqueous solution of a halogen salt, of which salt the chemical affinity of its halogen radical is less than that of the halogen gas admitted into the cell during the operation thereof, is poured into the cell to fill the open space in the frame 20, electrode 19, cloth 18, and part of the open space of the grooves 11. This solution serves not only as an electrolytic solution, but acts to dissolve the salts formed during the discharge of the cell. After this aqueous solution has been placed in the cell the same is ready for use as soon as gas of the proper kind is supplied to pipe 22. A suitable valve 25 is provided in pipe 22 for regulating the flow of gas therein, and a suitable valve 26 is provided for regulating the flow of air and gas from housing 1. During the first part of the operation of the cell the same is charged with halogen gas, as for instance compresed chlorin gas, and valves 25 and 26 are opened, whereupon the gas will flow into the cell or cells and drive out the air. As soon as the air has all been driven from the housing 1, the valve 26 is closed but valve 25 is left more or less open. The chlorin now circulating through the openings in the space between the corrugations of the upper electrode comes in contact with the halogen radical of lower chemical affinity in the salt in the cells (as $KBr$ or $KI$), whereby some of the halogen radical is displaced which is of higher specific gravity and which is also soluble in the solution so that the same remains therein. This liberated halogen radical coming in contact with the electrode 10 immediately reacts through the electrolyte on the zinc electrode 19 to again form zinc halogen, and is again immediately released by more chlorin to again react on the zinc electrode so as to again form zinc halogen. This operation is continued during the use of the cell whereby current may be drawn from the binding posts 2 and 3.

It will be observed that the action of the chemical parts of the cell do not depend upon the original eletrolyte placed therein as in the ordinary primary cell, but upon a continuous fresh supply of chlorin so that the cell may work at a maximum efficiency continuously without injury.

It will of course be evident that whenever zinc electrode 19 is dissolved or eaten up the same must be renewed. It will also be evident that the electrolyte in time must be renewed.

Having thus described my invention I claim as new and desire to secure by Letters Patent:—

1. A primary cell comprising a housing, a zinc container, a carbon electrode arranged in said container, a zinc member arranged in the bottom of said container, means for supporting said carbon electrode above said zinc member and out of contact therewith, an electrolyte formed of a halogen salt between said zinc member and said carbon electrode, and means for directing chlorin gas to the upper surface of said electrolyte for acting on the electrolyte and zinc whereby electrical energy is produced.

2. A primary cell comprising a housing, a container in said housing, a zinc frame arranged in the bottom of said container, a fibrous sheet arranged above said zinc frame, a carbon electrode resting on said fibrous sheet, an electrolyte comprising an aqueous solution of halogen salts, and means for directing chlorin gas to the upper surface of the electrolyte.

3. A primary cell comprising a housing, a metal container, arranged in said housing, a plate acting as an active agent arranged in said container, a porous spacing sheet supported by said active agent, a carbon electrode resting on said porous sheet, an electrolyte comprising an aqueous solution of halogen salts contacting with the active agent and partially submerging said carbon electrode, and means for directing chlorin gas to the surface of said electrolyte.

4. A primary battery comprising a metallic housing, a metallic container arranged in said housing and in contact therewith, a carbon electrode arranged in said container, a zinc plate arranged in the container, means for spacing said zinc plate from said carbon electrode, an electrolyte comprising a compound of a halogen radical capable of being replaced by chlorin, means for directing chlorin gas into contact with said electrolyte for acting on said electrolyte whereby a halogen radical is liberated, said halogen radical contacting with said carbon electrode and depolarizing the same, a binding post connected with said housing, and means for connecting a binding post with said carbon electrode.

5. A primary cell comprising a housing, a container arranged in said housing, a covering for the inner walls of said container for protecting said walls from the electrolyte of said cell, a zinc frame arranged adjacent the bottom of said container, a porous sheet of spacing material arranged above said zinc frame, a carbon electrode resting on said porous sheet, an electrolyte arranged in said container and submerging said zinc frame, said porous sheet, and part of said carbon electrode, means for directing chlorin gas to the surface of said electrolyte, means for connecting a binding post with said housing, and means for connecting a binding post to said carbon electrode.

6. A primary cell comprising a housing, a container arranged in said housing, a zinc framework arranged in the bottom of said container, a zinc gridiron shaped member arranged above said framework, an asbestos sheet arranged above said gridiron shaped member, a carbon electrode formed with a plurality of ridges resting on said asbestos sheet, an electrolyte comprising an aqueous solution of halogen salts, and means for directing chlorin to the upper surface of the electrolyte.

7. A primary cell comprising a metallic housing, a metallic container arranged in said housing and contacting therewith, an insulating lining for the side and end walls of the container, a plate acting as an active agent arranged in said container, a porous spacing sheet arranged above the active agent, a carbon electrode formed with ridges resting on said porous spacing sheet, an electrolyte contacting with the active agent and partially submerging said carbon electrode, and means for directing chlorin to the surface of said electrolyte.

8. A primary cell comprising a metallic housing, a zinc container arranged in said housing and contacting therewith, a zinc member arranged adjacent the bottom of said container, a porous fibrous sheet arranged above said metallic member, an electrolyte submerging the zinc member, and fibrous sheet, an electrode resting on said fibrous sheet whereby the lower part thereof is submerged, means for directing chlorin to the surface of said electrolyte, means for connecting said electrode with a binding post, and means for connecting the binding post to said housing which acts as a terminal connection to said first mentioned electrode.

9. A primary cell comprising a cell housing, a zinc container arranged in said housing and contacting therewith, a rubber covering for the inner walls of said container, a zinc frame resting on the bottom of said container, a zinc gridiron shaped electrode resting on said frame, an asbestos sheet resting on said electrode, a carbon electrode formed with a plurality of grooves, said carbon electrode resting on said asbestos sheet, an electrolyte arranged in said container, and submerging said zinc frame, said first mentioned electrode, asbestos sheet, and part of said carbon electrode, means for directing a halogen gas to the surface of said electrolyte, means for connecting a binding post to said housing, and means for connecting a binding post to said carbon electrode.

In testimony whereof I have signed my name to this specification in the presence of two subscribing witnesses.

HOMER E. R. LITTLE.

Witnesses:
JOHN E. MCNAB,
E. B. KEARNEY.